United States Patent
Vijayvergia et al.

(10) Patent No.: US 12,135,757 B1
(45) Date of Patent: Nov. 5, 2024

(54) SYSTEM AND METHODS FOR PREDICTIVE CACHING BASED ON UNEXPECTED EVENTS

(71) Applicant: UIPCO, LLC, San Antonio, TX (US)

(72) Inventors: Gunjan C. Vijayvergia, San Antonio, TX (US); Anand Shah, Helotes, TX (US); Alan David Chase, Boerne, TX (US); Anil Sanghubattla, San Antonio, TX (US); Andrew P. Jamison, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/520,839

(22) Filed: Nov. 8, 2021

Related U.S. Application Data

(60) Provisional application No. 63/111,436, filed on Nov. 9, 2020.

(51) Int. Cl.
*G06F 16/957* (2019.01)
*G06F 16/29* (2019.01)
*G06F 16/9535* (2019.01)

(52) U.S. Cl.
CPC .......... *G06F 16/9574* (2019.01); *G06F 16/29* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 7,895,448 B1 | 2/2011 | Satish | |
| 9,414,222 B1* | 8/2016 | Dixon | H04L 67/62 |
| 10,218,811 B1 | 2/2019 | Demsey | |
| 2011/0040718 A1 | 2/2011 | Tendjoukian | |
| 2012/0303896 A1* | 11/2012 | McGroddy-Goetz | G06F 12/0866 |
| | | | 711/E12.017 |
| 2013/0275685 A1 | 10/2013 | Barbas | |
| 2014/0095943 A1* | 4/2014 | Kohlenberg | H04L 65/40 |
| | | | 714/E11.179 |
| 2014/0101170 A1 | 4/2014 | Parekh | |
| 2014/0258094 A1* | 9/2014 | Jouhikainen | G06Q 40/08 |
| | | | 705/38 |

(Continued)

OTHER PUBLICATIONS

Non-Final Office Action mailed Aug. 18, 2023 for U.S. Appl. No. 17/520,796.

(Continued)

*Primary Examiner* — Kevin S Mai
(74) *Attorney, Agent, or Firm* — Plumsea Law Group, LLC

(57) ABSTRACT

A system and method for improving the delivery of information to a remote user by anticipating the information that might be requested, and populating a cache with that information such that it may be more quickly retrieved when the remote user requests it. The cache may be located on one of the institution's servers, or the user's computing device, on an intermediate server such as a server in the cloud, or on a combination of these servers or devices. The embodiments disclosed herein apply when an unexpected event occurs or is predicted such as a hurricane or other weather event; a financial event, or a personal event such as a car accident or a medical emergency.

20 Claims, 8 Drawing Sheets

(56) References Cited

U.S. PATENT DOCUMENTS

| | | | |
|---|---|---|---|
| 2015/0227463 A1* | 8/2015 | Byers | G06F 16/113 |
| | | | 711/137 |
| 2016/0191650 A1 | 6/2016 | Rong | |
| 2019/0370176 A1 | 12/2019 | Priyadarshi | |
| 2021/0329091 A1 | 10/2021 | Yellin | |

OTHER PUBLICATIONS

Notice of Allowance mailed Jan. 23, 2024 for U.S. Appl. No. 17/520,796.

Ebrahimi, E., Chang, J. L., Mutlu, O., & Patt, Y. N. (2011). Prefetch-aware shared-resource management for multi-core systems. (Year: 2011).

* cited by examiner

SYSTEM AND METHODS FOR PREDICTIVE CACHING BASED ON UNEXPECTED EVENTS

CROSS-REFERENCE TO RELATED APPLICATIONS

This application claims the benefit of Provisional Patent Application No. 63/111,436, filed Nov. 9, 2020, and titled "Systems and Methods for Predictive Caching Based Upon Unexpected Events," which is incorporated by reference herein in its entirety.

TECHNICAL FIELD

This disclosure relates to caching anticipated data when an unexpected event occurs, to enable users to retrieve requested data more quickly.

BACKGROUND

When an unexpected event occurs, such as a weather event (for example, a hurricane, a flood or a snowstorm), a financial event (for example, a drastic change in the stock market or in the value of a particular stock), or a personal event (for example, a car accident or a medical emergency), customers of an institution may need to obtain information from that institution as quickly as possible. In most cases, the customers may need to access the information stored on the institution's servers remotely, using their personal computing devices. However, the delivery of information requested via a remote computing device from an institution's server may typically be somewhat delayed as the server locates, identifies and delivers the data for transmission to the institution's customers' computing devices.

For these reasons, there is a need for systems and methods that more quickly deliver requested information to remote customers' computing devices.

SUMMARY

In one aspect, embodiments include a method for improving the delivery of information from an institution to a remote customer that includes learning of an unexpected event related to the remote customer, anticipating that the remote customer will need to be provided with the information in order to take action in view of the unexpected event, populating a cache with the information, and notifying the customer that the cache has been populated with the information.

In another aspect, embodiments include a system for providing information from an institution to a remote customer that includes a server facility at the institution. The server facility has an accounts database that contains customer information. The server facility also has a caching server that is in communication with the accounts database, and a monitoring module in communication with the caching server. The caching server is configured to respond to an unexpected event by populating a cache with information that it anticipates the customer may need in consequence of the unexpected event.

In yet another aspect, embodiments include a method for reducing delays in the delivery of information to a customer's computing device that defines which events qualify as unexpected events and includes identifying an occurrence of an unexpected event. A cache for storage of data related to the identified unexpected event is then prepared, data related to the identified unexpected event is stored in the cache, and the customer is notified that the data has been stored in the cache.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

DESCRIPTION OF EMBODIMENTS

Figure 1:
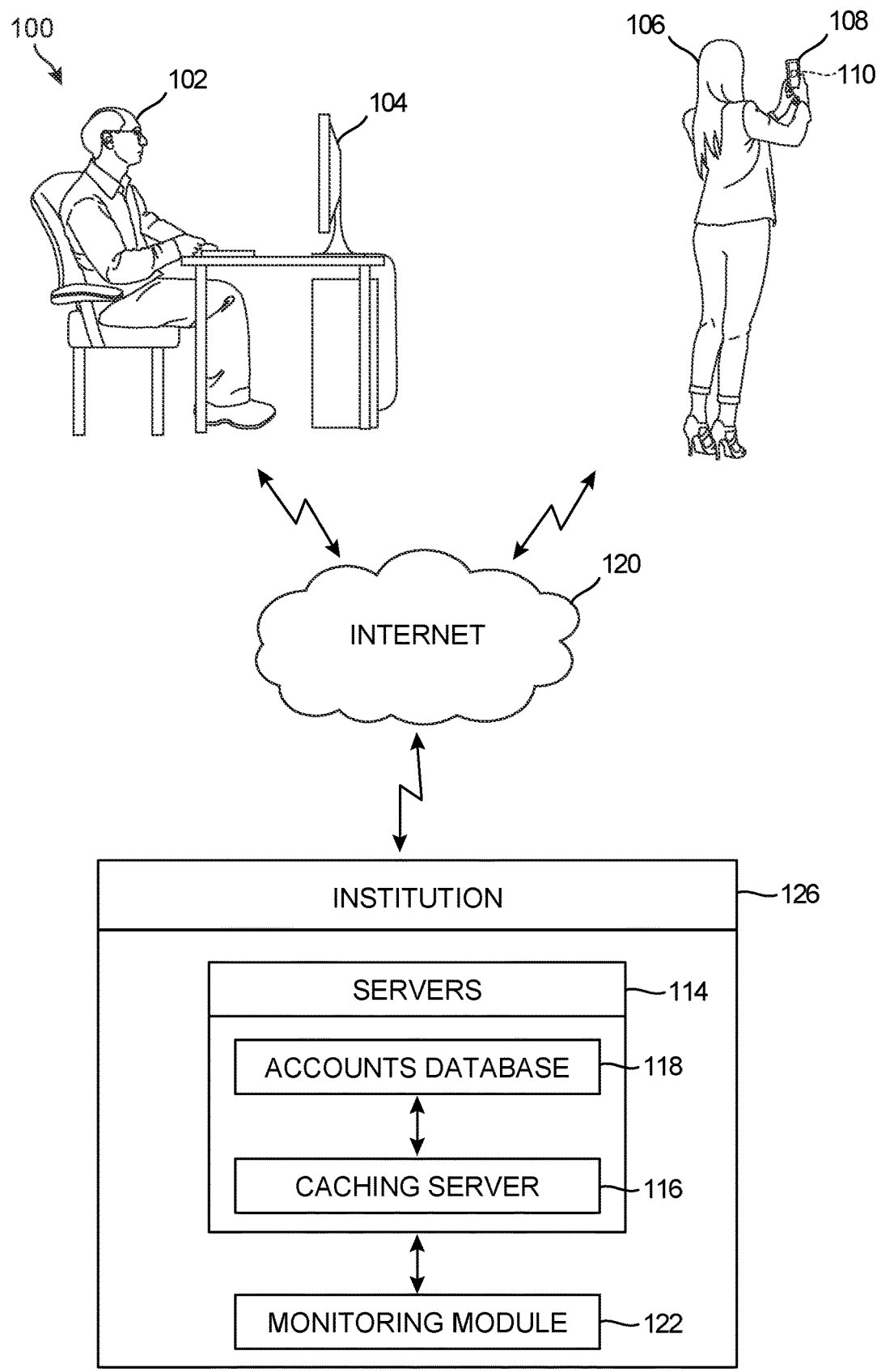
FIG. 1 is a schematic block diagram of a network that implements caching of timely information when an unexpected event occurs, in an embodiment.

The embodiments disclosed herein improve the delivery of information to a remote customer or user by reducing certain delays in the delivery of that information when an unexpected event occurs. The embodiments do so by anticipating the information or the category of information that might be requested, and populating a cache with that information such that it may be more quickly retrieved when the remote customer or user requests it. The cache may be located on one of the institution's servers, or the customer's or user's computing device, on an intermediate server such as a server in the cloud, or on a combination of these servers or devices.

Briefly, the embodiments described herein apply when an unexpected event occurs or is predicted such as a hurricane, a flood, a snowstorm or other weather event; a financial event such as a drastic change in the stock market or in a value of one or more stocks the institution's customer may be tracking; a government event such as an announcement by the Federal Reserve or a change in environmental regulations; or a personal event such as a car accident or a medical emergency. A monitoring module in communication with an institutional caching server triggers the caching of pertinent information to aid customers of the institution to deal with the event in an expedited manner.

As used herein, the terms "customer" and "user" shall have the same meaning, and may be used interchangeably and shall refer to any person who has an established relationship with an institution and needs access to data stored at the institution. The term "institution" refers to a bank, an insurance company, a savings and loan, a credit union or other financial institution, a retailer or other organization or company that customers may access remotely. The term "encryption module" shall encompass modules that have both encryption and decryption functionalities, and shall also encompass the combination of separate encryption and decryption modules. The term "computing device" shall refer to any of a smart phone, a mobile device, a laptop, a tablet, a desktop computer or other device that may be used for remote access to an institution's server. The term "external server" refers to a server housed outside of the institution. The term "unexpected event" shall refer to any unscheduled event, such as the events described specifically herein and other unscheduled events.

For example, when a hurricane is predicted, the embodiments described herein anticipate that certain institutions such as insurance companies and banks may receive numerous requests for assistance at the same time. In responding to these requests, these institutions can anticipate based on their past experience the types of information that may be requested, and could populate caches with the information before being specifically requested to do so, thus speeding up the process.

In the event that the unexpected event is a financial event, such as a drastic change in the value of a stock a customer (or his or her financial advisor) is tracking, the customer may be the one who starts the process by notifying the institution (which could be a bank) of the event. The bank can then prepare a cache with information that the customer is likely to need in response to the unexpected event.

In the event that the unexpected event is a car accident, the customer may also initiate the process by notifying his or her insurance company of the accident. The insurance company could then populate a cache for the customer with the name and contact information of an adjuster, a claim number, and a list of collision repair shops, and other relevant information, for example.

FIG. 1 is a schematic diagram 100 of a network which implements caching of timely information when a predefined unexpected event occurs that a customer 106, in this example a customer of institution 126, has previously identified. Institution 126 has at least one server facility 114, which houses an accounts database server 118, a caching server 116 and a monitoring module 122. In the embodiment illustrated schematically in FIG. 1, customer 106 has defined an event regarding which, should it occur, he or she would need information regarding his or her accounts or regarding responses to the event from institution 126. In the example of FIG. 1, where the event is a financial event, such as a drastic change in the value of an asset such as a stock, employee 102 of institution 126 may receive a notification of the event via his or her computing device 104 over the Internet 120. Employee 102 then prepares a set of responses consistent with the previously defined preferences of customer 106. These preferences may have been stored in accounts database 118, for example. Employee 102 then delivers the content of the responses over Internet 120 to a caching server 116 that is responsible for preparing the cache for customer 106. Caching server 116 may be one of a set of remote servers 114 maintained by institution 126 for communicating with customer 106. Caching server 116 then delivers the responses to a cache 110 housed on a customer's computing device (such as a smart phone) 108. In some embodiments, caching server 116 prepares a push notification to let customer 106 know that the predefined event has occurred and that institution 126 has prepared a set of responses for prompt action by customer 106 and/or has stored relevant information in cache 110. The responses may be displayed on computing device 108 when prompted by customer 106. Customer 106 can then quickly take appropriate action. Cache 110, for example, may be a cache on a smart phone, such as cache 326 shown in FIG. 3 and described below. In some embodiments, cache 110 may be housed in a remote server, for example a cloud server selected so as to maximize the speed of the transmission of data stored in the cache to the customer's computing device.

In some cases, the event is a publicly disseminated defined event that, at the customer's instructions, has been stored in accounts database 118, for example, or in some other database. For example, the customer may have defined an event such as an announcement by the Federal Reserve of a change in the prime interest rate, and requested that monitoring module 122 monitor Federal Reserve announcements regarding changes in the prime rate. Monitoring module 122 then automatically monitors Federal Reserve prime rate announcements to determine if the defined event—a change in the prime interest rate—has occurred. Whenever monitoring module 122 determines that there has been a change in the Federal Reserve's prime interest rate, it transmits that information to caching server 116, which collects data that customer 106 has defined as information the customer might need to respond to the change in the prime interest rate, and transmits information to a cache, such as cache 110 in the customer's computing device 108. Also, although the embodiment of FIG. 1 includes action by an employee 102, in other embodiments the caching procedure may be performed automatically.

Other examples of publicly disseminated information may include data such as the unemployment rate, the exchange rate of the German mark against the U.S. dollar, reports of weather that might affect the production of agricultural commodities, the price of a barrel of oil, and so on. The monitoring module could be programmed to monitor such publicly available data, and to initiate populating customers' caches in response to changes in that data.

Figure 2:
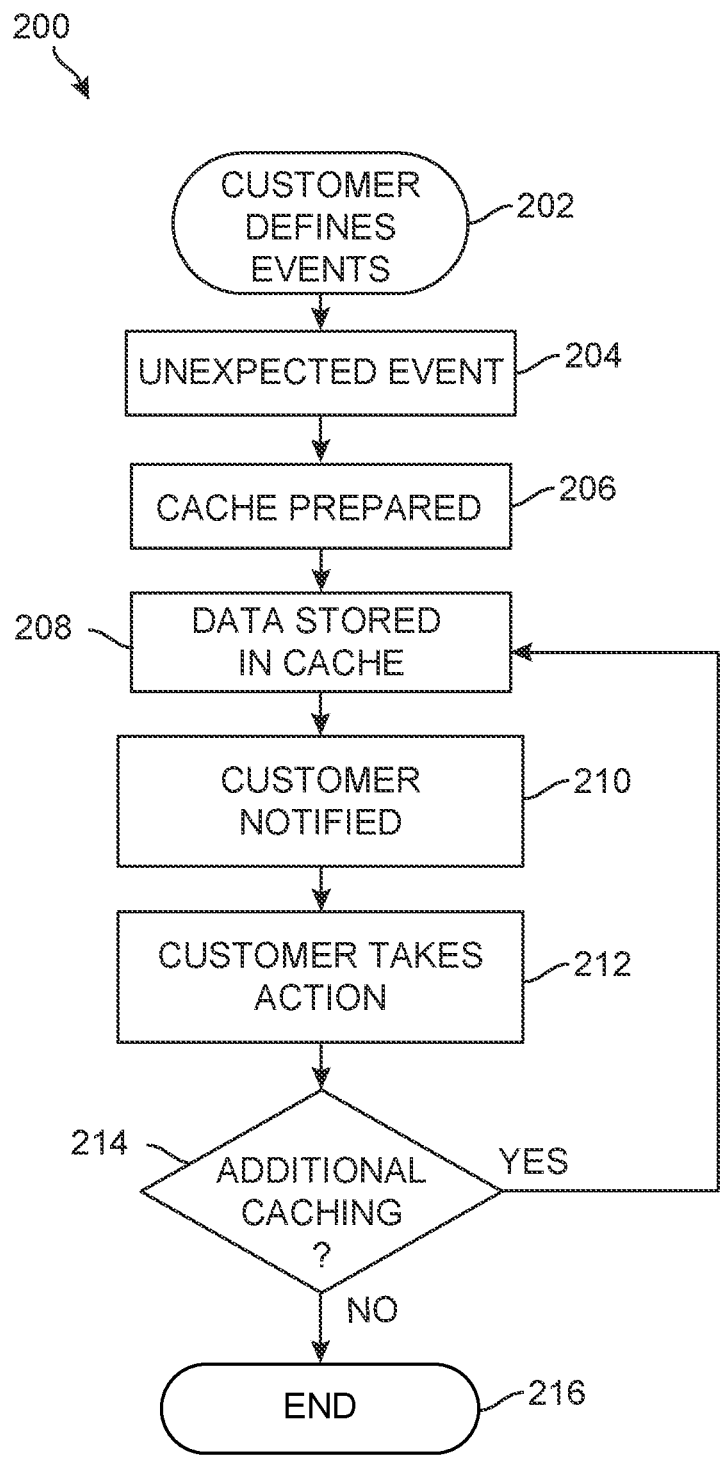
FIG. 2 is a flowchart illustrating a method for caching timely information in the event an unexpected event occurs, in an embodiment.

FIG. 2 is a flowchart 200 illustrating a process for caching timely information in case an unexpected event occurs that a customer of the institution has identified as being of interest to that customer. Flowchart 200 begins at step 202 as the customer defines an event or a set of events that he or she would like the institution to monitor. In some circumstances, the customer defines a set of preferred actions he or she would like the institution to prepare to take if the event occurs. In some embodiments, such customer defined events are stored as part of their account information in a database, such as accounts database 118 shown in FIG. 1.

At some later time, a defined event occurs at step 204. This triggers a process for preparing data to store in a cache for the customer. Thus, if the specific cache to be used for this event has not already been identified, an appropriate cache is prepared either within the institution's caching server or in the customer's computing device or in a server external to the institution at step 206. If a suitable cache has already been identified, that step may not be necessary, since the cache was identified before the unexpected event had occurred. In some embodiments, identifying an appropriate cache for the data includes minimizing the time it takes to transmit the data from the cache to the customer, once the customer requests the data. The data required for these responses may include any data or templates needed to display the data to the customer. At step 208, these data are stored in the cache, and the customer is notified in step 210 of the occurrence of the event, and that cached data has been prepared for the customer. In step 212, the customer then takes action based upon the data. The process may then determine at step 214, based upon the action the customer has taken, that the customer may need follow-up data stored in the cache. If the customer does not need any follow-up data, the process ends at step 216. Otherwise, the process returns to step 208, where it stores follow-up data that it anticipates the customer may require in order to follow up on the action taken in step 212.

Figure 3:
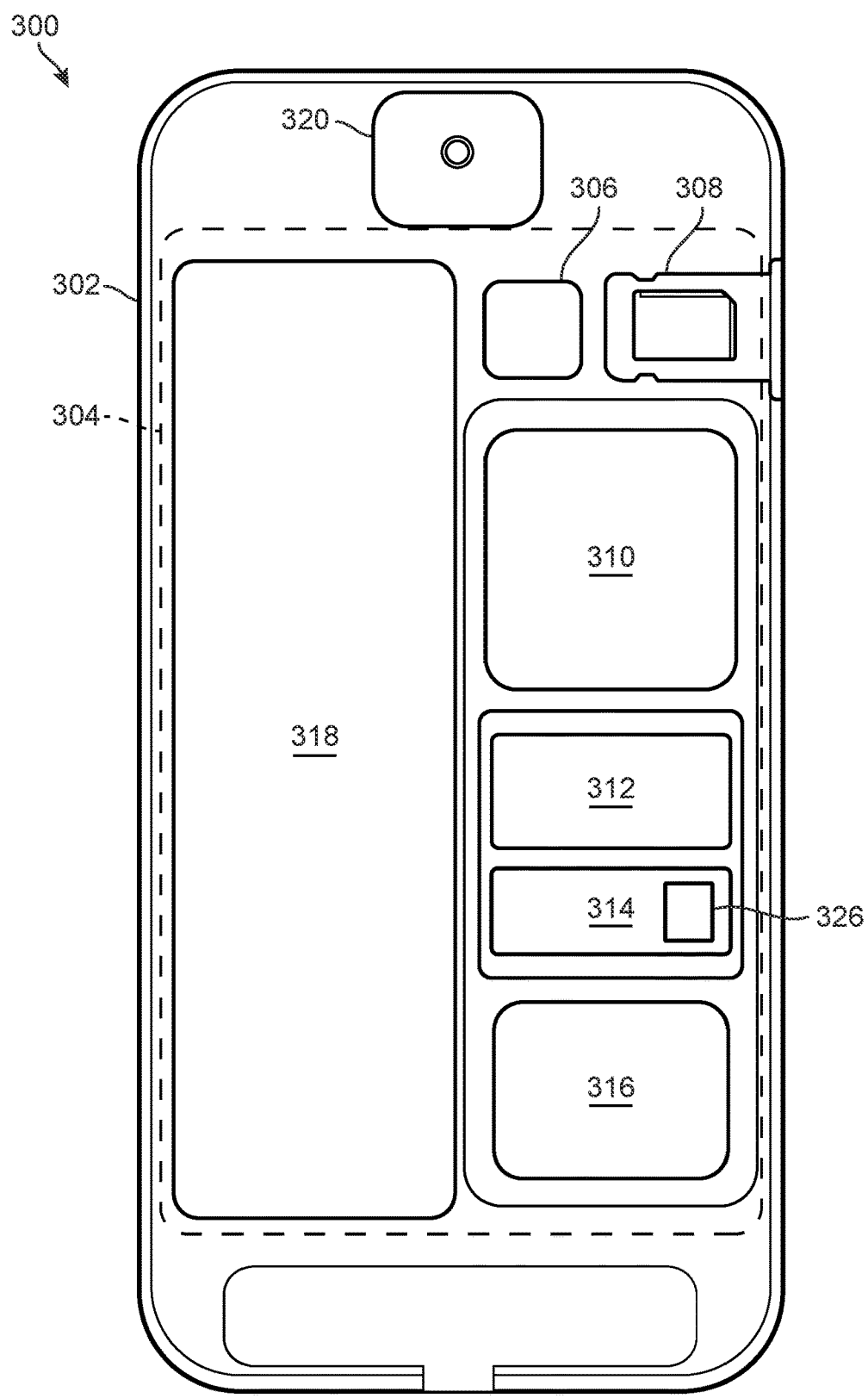
FIG. 3 is a schematic diagram of a computing device.

FIG. 3 is a schematic diagram 300 of common components of a typical smart phone 302, such as smart phone 108 shown in FIG. 1, that may be used to implement the embodiments disclosed herein. Functionally similar components are present in the other types of computing devices listed above. In this example, smart phone 302 includes a display 304, which displays applications and data stored on smart phone 302. Smart phone 302 additionally includes a GPS component 306. Smart phone 302 includes a subscriber identity module (SIM) 308 with which smart phone 302 registers on cellular/data networks. In some embodiments, SIM 308 also serves as an identifying means with which to associate smart phone 302 with a particular customer who has an account on a remote server.

Smart phone 302 includes a processing unit 310 which acts as a control module for the components of mobile device 302, including display 304 and camera 320. Smart phone 302 includes a connection module 312. Connection module 312 is associated with wired connections to smart phone 302, for example, for charging smart phone 302 or for making a wired connection between smart phone 302 and another device.

Smart phone 302 includes a memory 314. Memory 314 stores a variety of data and applications, including preloaded applications and data that would be common to all customers of such a device and applications and data that have been stored in the course of regular use of smart phone 302 by a particular customer and are thus characteristic of the particular customer using smart phone 302. In this embodiment, memory 314 may also include a cache 326. Smart phone 302 includes communications module 316 which controls communications with the institution server and/or with a cloud server. Communications module 316 executes wireless communications (such as Wi-Fi, Bluetooth, near field communication (NFC) technologies, and communications over the Internet) between smart phone 302 and other devices, servers, and databases. Communications module 316 thus functions as a link to remote servers. Smart phone 302 includes a battery 318 which provides power to the various components of smart phone 302.

Figure 4:
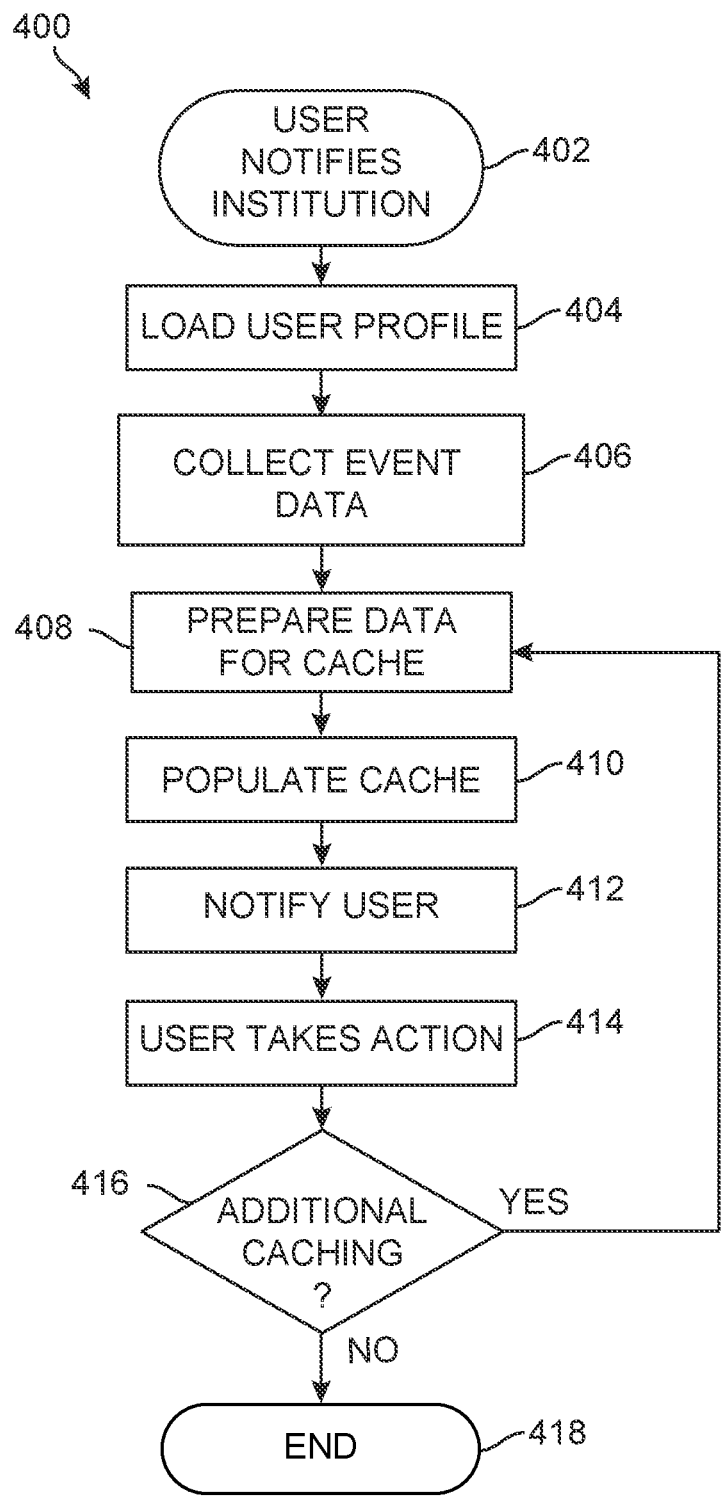
FIG. 4 is a flowchart illustrating a method for caching information in the event a user notifies an institution of an unexpected event, in an embodiment.

FIG. 4 is a flowchart 400 showing an example of a process for caching information in the event a user notifies the institution of an unexpected event. The process starts when the user notifies the institution in step 402. Typically, the notification may be transmitted via a monitoring module, but it may be transmitted to a caching server. Optionally, the caching server would then retrieve the user's risk profile in step 404 to ensure that the institution can respond diligently to any request for funds, for example. In other embodiments, the caching server retrieves the user's preferences to determine how the customer would like the institution to respond to the event. Then, in step 406, the caching server may retrieve and prepare the data to send to the cache. For example, if the unexpected event is a car crash, the user optionally includes information describing the damage to the vehicle and injuries that may have been suffered by the persons involved in the accident. As noted above, the cache may be in the user's mobile device, such as cache 326 in the schematic of a smart phone shown in FIG. 3, or it may be housed in the caching server or in another server that is closer to the user's mobile or other computing device. The method then populates the data in the cache in step 410, and notifies the user that it has done so in step 412.

The user then reviews the notification and takes some action based upon the notification in step 414. For example, if the event is a financial event, the user may withdraw funds from one of his or her accounts in preparation for a purchase, or may request a loan from the institution. If the event is a car accident and the institution is an insurance policy, the user may be submitting a claim in step 414, for example. In step 416, based upon the user's action in step 414, the caching server may anticipate that the user may need additional data. In that case, the caching server would return to step 408 to prepare the additional data and then populate the cache in step 410. However, if no additional data is needed, the process ends at step 418.

Figure 5:
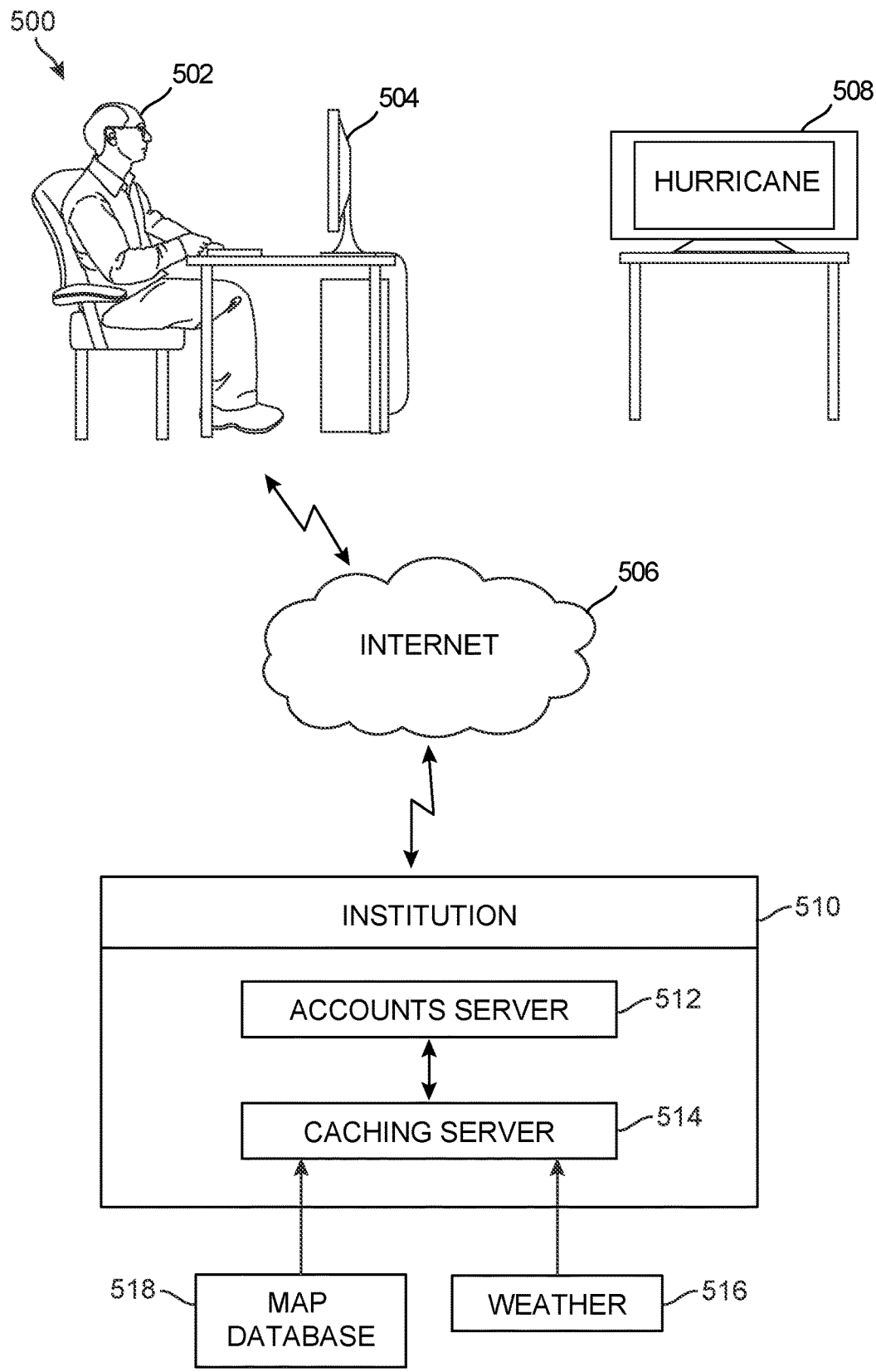
FIG. 5 is a schematic diagram of a network which implements caching when an unexpected event affects a large number of customers, in an embodiment.
Figure 6:
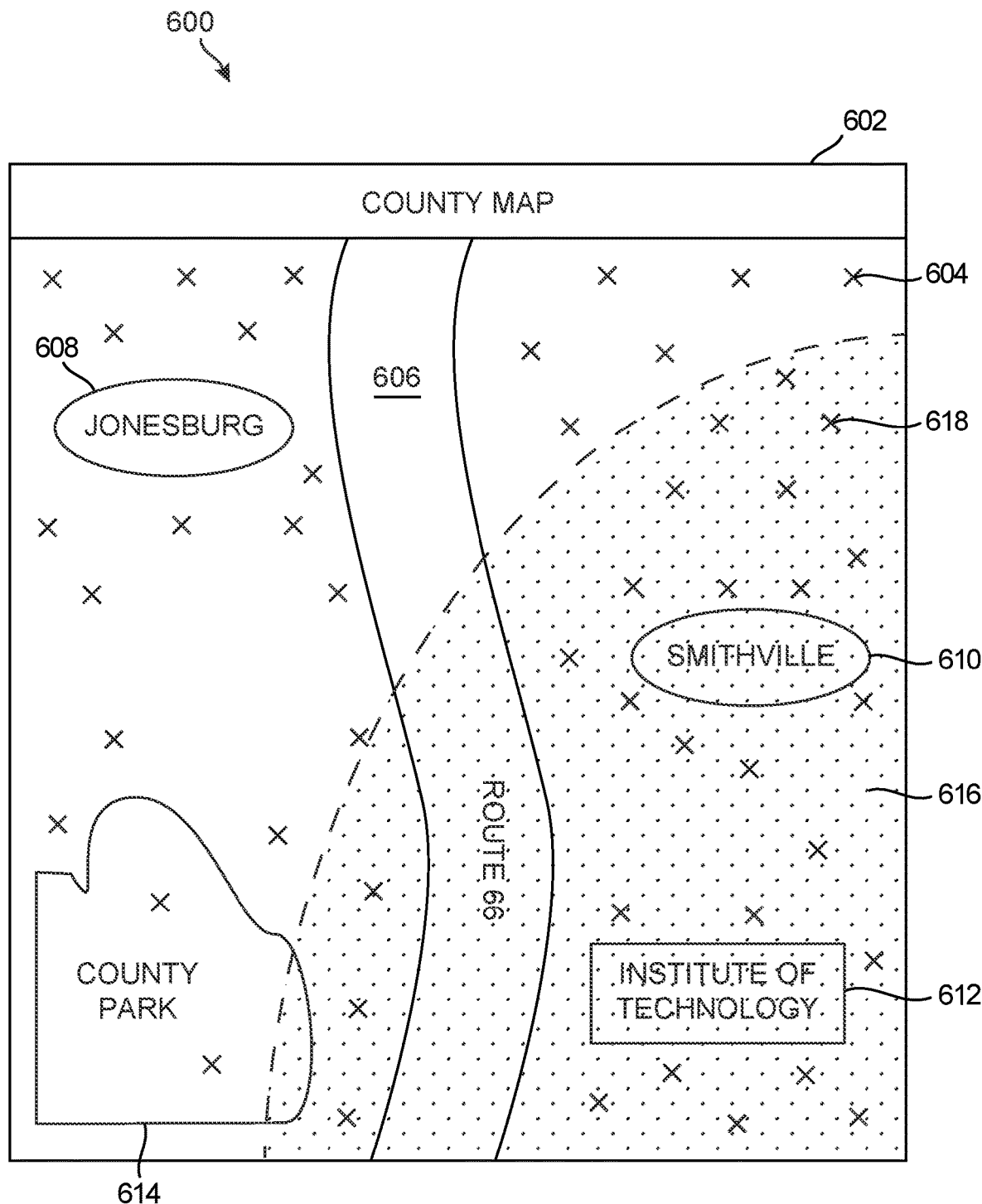
FIG. 6 is a schematic example of a map illustrating the effect of a weather event on a large number of customers.

FIG. 5 is a schematic diagram 500 of a network which implements caching when an unexpected event, such as a severe weather event, affects a large number of customers, in an embodiment. An example of such a severe weather event—in this case flooding due to a hurricane—is illustrated in FIG. 6. In the network shown schematically in FIG. 5, external databases such as a weather monitoring module 516 and map database 518 are in communication with caching server 514. The weather monitoring module 516 provides detailed, up-to-date reports regarding the incoming hurricane to caching server 514. In some embodiments, weather monitoring module 516 is in communication over the Internet 506 with caching server 514, and provides its reports to caching server 514 over the Internet.

The detailed information provided by weather monitoring module 516 regarding the hurricane, may include an estimate, for example, of the flooding the hurricane is likely to produce. Caching server 514 can obtain a map of the affected area from map database 518, and can download the institution's customers home addresses from accounts server 512. In some embodiments, map database 518 is in communication with caching server 514 via Internet 506, although in other embodiments the communication may be over telephone or cable systems. It can then overlay the area expected to be flooded with a map including an identification of the home addresses, as shown in FIG. 6. Once caching server 514 has identified the set of customers it expects to be affected by the event, it prepares specific caches for each specific customer populated with information useful to that specific customer.

In some embodiments, the caching server selects the information that would be stored in the specific customer's cache, generally based upon previously established customer preferences. In some embodiments, the caching server uses the customer's account information and the customer's profile to determine the data to be stored in the customer's cache. For example, the caching server may store the amount of an emergency loan the institution 510 may offer the customer, or financial details regarding the customer's homeowner policy. In the embodiment of FIG. 5, employee 502 is notified on his computer 504 via the Internet 506 by caching server of the set of customers it expects will be affected by the event. Employee 502 may also monitor the progress of the hurricane on a television set 508. Employee 502 then prepares the information to be cached for each specific customer, and provides that information to caching server 514, which in turn transmits the information to the appropriate caches.

FIG. 6 is a schematic drawing 600 of a map 602 illustrating the effect of a weather event on a large number of customers. Map 602 shows various features of the area, including in this example a route 606, towns 608 and 610, a university 612 and a park 614. FIG. 6 also shows the locations of the customers 604 who are outside of the projected flood zone 616, and the customers 618 who are located within the flood zone. Caching server 514 can then anticipate which of the institution's customers may need information during this emergency. For example, if the institution is a bank, some customers may have left their homes because of the emergency, and may need a quick loan so that they can pay their daily expenses until they can return home. If the institution is an insurance company, the caching server could anticipate that some homeowners would likely be filing claims, and could prepare a cache with the information the homeowners would need.

Figure 7:
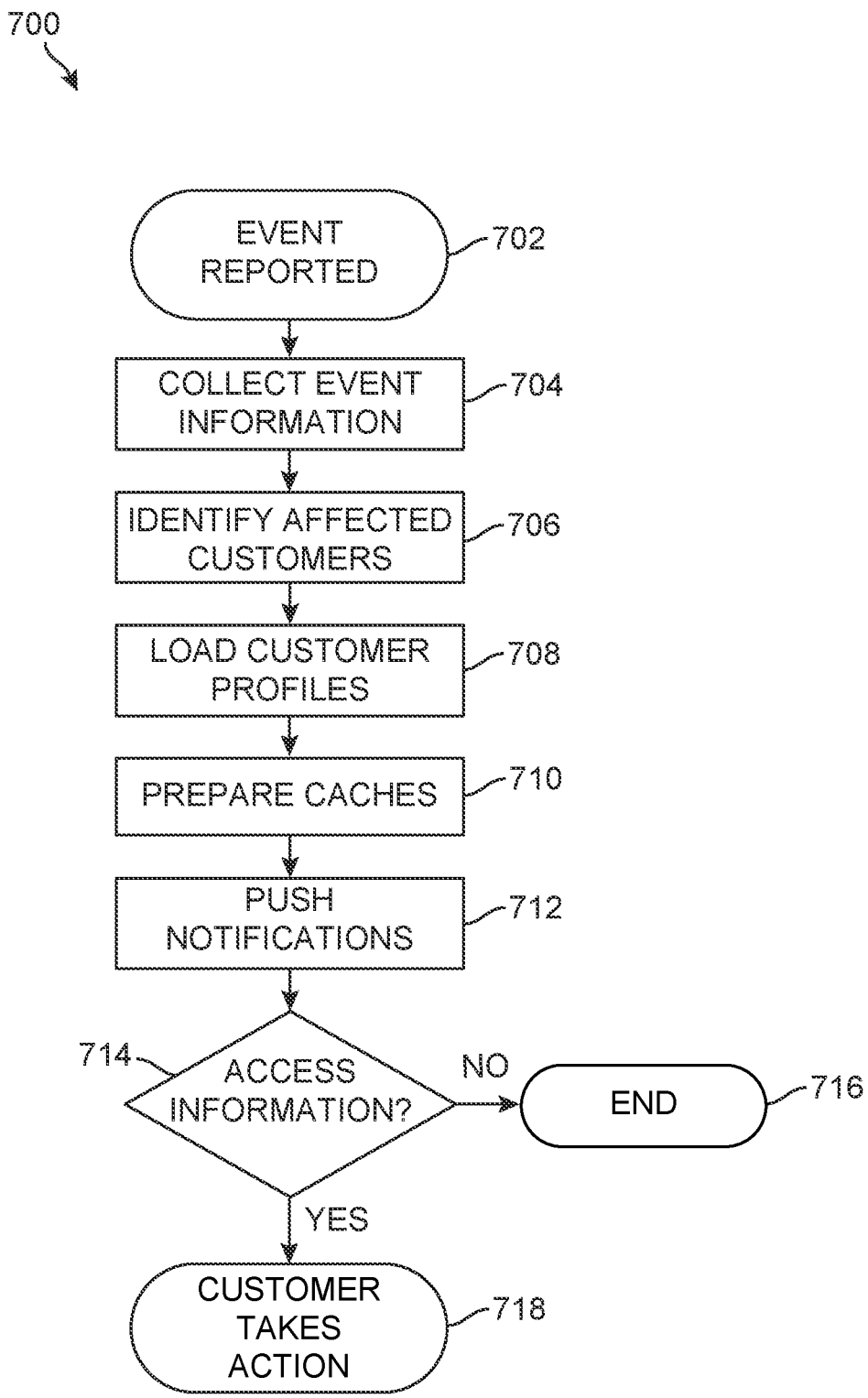
FIG. 7 is a flowchart illustrating a method for caching information in the case of a weather event affecting a large number of customers, in an embodiment.

FIG. 7 is a flowchart 700 illustrating an example of a process for caching information in the case of a weather event affecting a large number of customers, such as the flooding depicted in FIG. 6. The process starts at step 702, when the event is reported to a caching server. In step 704, it collects information regarding the event, such as its geographical extent, as shown in the example of FIG. 6. The caching server then identifies the institution's customers who may be affected by the weather event in step 706. The caching server may also load the risk profiles of the customers who may be affected by the weather event in step 708. The caching server may then prepare the caches for the potentially affected customers in step 710, and may notify the customers that it has done so in step 712.

In step 714, the caching server determines, for each specific customer, whether the customer has decided to access the information in the cache. In step 716, if the customer has declined to access the information, the process ends. In some embodiments, the caching server may clear the cache if it determines that the customer has not accessed the cache after a given amount of time has elapsed. It may also update the cache using more recent information. In general, data such as a list of accounts is less volatile and does not need to be updated as often, while the actual amounts in the accounts is volatile and may need to be updated quite often. However, if the customer does access the information, the customer may then take action using the data he or she has retrieved from the cache in step 718.

Figure 8:
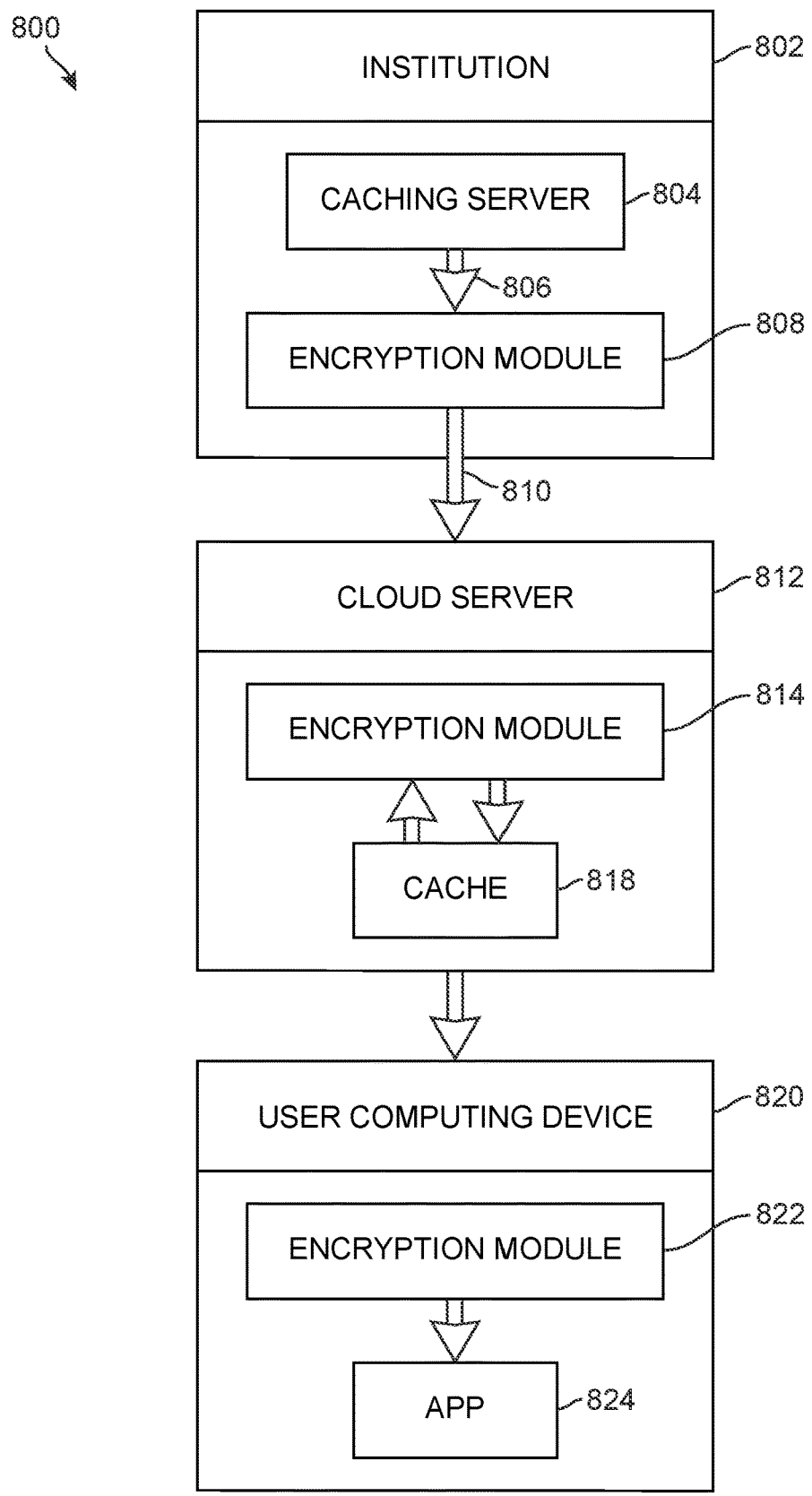
FIG. 8 is a schematic diagram illustrating encryption in communications between a server and a remote computing device, in an embodiment.

Because the information being transmitted to a cache is likely to be confidential, that information may be encrypted as shown in FIG. 8. FIG. 8 is a schematic block diagram 800 illustrating an embodiment of encryption in the communications between a remote server and a computing device. To protect confidentiality, institution 802 may encrypt confidential data before its transmission to cache 818. Caching server 804 prepares data 806 for transmission to user app 824 via cache 818. Data 806 is encrypted by encryption module 808, thus producing encrypted data 810. Although, in FIG. 8 encryption module 808 is shown as distinct from caching server 804, in some embodiments it could be included in caching server 804. Also, in some embodiments, the data may be combined into a JSON payload before encryption.

As shown in FIG. 8, encrypted data 810 may be transmitted to a cloud server 812, which maintains cache 818. Cloud server 812 has its own encryption module 814 which encrypts data stored in its own data storage devices. Thus, the data stream 810 may be further encrypted in the cloud before it is transmitted to and stored in cache 818, i.e., the data may be doubly encrypted.

When the user computing device 820 calls for the data in cache 818, the doubly encrypted data is passed back to module 814, which decrypts the data for transmission to user computing device 820, so that the original singly encrypted data 810 is transmitted to user computing device 820. The encrypted data 810 is then decrypted by encryption module 822, and passed on to app 824. App 824 may then display the decrypted data on the screen of user computing device 820. Although FIG. 8 shows encryption module 822 as being distinct from app 824, the app itself may include an encrypting/decrypting function.

Although the descriptions above may describe systems in which one server may house an accounts database and a caching server, with an external monitoring module as shown in FIG. 1, the embodiments should not be limited to any particular architecture. Thus, the components needed to implement the embodiments disclosed herein may all be present as applications in one server or computer, or may be distributed among several servers or computers, or may be stand-alone devices, or any combination of the foregoing.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method performed by a server associated with an insurance company for improving delivery of information from the insurance company to a remote device associated with a customer of the insurance company comprising:
    receiving, from the customer, a definition of an unexpected event related to the customer and a plurality of preferred responses to prepare to take if the unexpected event occurs;
    wherein the unexpected event is a car accident involving the customer;
    storing the definition of the unexpected event and the set of preferred responses;
    identifying, using the definition and information received from the remote device, an occurrence of the unexpected event;
    anticipating that the customer will need the plurality of preferred responses to be provided in view of the unexpected event, including by determining a type of information requested by the customer upon a previous occurrence of the unexpected event;
    causing a cache located on the remote device to be populated with the plurality of preferred responses, the plurality of preferred responses including at least the name and contact information of an adjuster, a claim number, and a list of collision repair shops;
    notifying the customer that the cache has been populated with the plurality of preferred responses upon the identification of the occurrence of the unexpected event; and
    allowing the customer to take an action using the remote device in response to accessing the cache and receiving the plurality of preferred responses.

2. The method of claim 1,
    wherein the step of identifying, using the definition and information received from the remote device, the occurrence of the unexpected event further includes the user submitting information describing damage to a vehicle and injuries suffered by persons involved in the car accident.

3. The method of claim 1, further comprising:
determining that the customer has taken an action using the plurality of preferred responses in the cache;
determining, after the customer has taken the action, additional information based on the action taken; and
causing the cache to be populated with the additional information.

4. The method of claim 1, further comprising monitoring, by a monitoring module of a server, a data stream in which the unexpected event appears.

5. The method of claim 1, further comprising loading a user profile of the customer into at least one of a caching server and an accounts database, wherein the caching server receives the information related to the unexpected event from a monitoring module in communication with the caching server.

6. The method of claim 1, wherein the step of allowing the customer to take an action in response to accessing the cache and receiving the plurality of preferred responses includes allowing the customer to submit an insurance claim.

7. The method of claim 1, wherein the remote device is a smart phone.

8. A system for providing information from an insurance company to remote customers comprising:
a server facility at the insurance company;
an accounts database maintained in the server facility at the insurance company that contains information about the remote customers including a definition of an unexpected event associated with a first customer of the remote customers and a plurality of preferred responses to prepare to take if the unexpected event occurs associated with the first customer of the remote customers, wherein the definition and plurality of preferred responses are received from the first customer;
wherein the unexpected event is a car accident involving the first customer;
wherein the plurality of preferred responses includes at least the name and contact information of an adjuster, a claim number, and a list of collision repair shops;
a caching server in the server facility that is in communication with the accounts database; and
a monitoring module in communication with the caching server and with access to a data stream;
wherein the caching server is configured to respond to changes in the unexpected event detected by the monitoring module in the data stream by causing a cache of a remote device to be populated with updated information comprising the plurality of preferred responses responsive to the changes, including by determining a type of information requested by the customer upon a previous occurrence of the unexpected event and then informing the customer that the data has been prepared for the customer;
wherein the remote device is accessible to the first customer, and preparing a push notification to the remote device of the first customer about the plurality of preferred responses in the cache, and the remote device is configured to allow the customer to take an action using the remote device in response to accessing the cache and receiving the plurality of preferred responses.

9. The system of claim 8, wherein the caching server receives the information from an external database.

10. The system of claim 8, wherein the remote device allowing the customer to take an action in response to accessing the cache and receiving the plurality of preferred responses includes allowing the remote device being configured to allow the customer to submit an insurance claim.

11. The system of claim 8, wherein the caching server is configured to notify the first customer that the cache has been populated with the plurality of preferred responses.

12. The system of claim 8, wherein the remote device including the cache is one of a cloud server and the computing device of the first customer, and wherein the plurality of preferred responses populated in the cache is encrypted.

13. The system of claim 8, wherein the data stream further includes the first customer submitting information describing damage to a vehicle and injuries suffered by persons involved in the car accident using the remote device.

14. A method performed by a server of an insurance company for reducing delays in delivery of data from the server to a computing device associated with a customer of the insurance company in response to an unexpected event comprising:
receiving, from the customer, a definition of the unexpected event and a plurality of preferred responses to prepare to take if the unexpected event occurs;
wherein the unexpected event is a car accident involving the customer;
storing the definition of the unexpected event and the set of preferred responses;
identifying, using the definition and information received from the remote device, an occurrence of the unexpected event;
preparing a cache for storage of data related to the occurrence of the unexpected event, the cache being located on the computing device associated with the customer;
anticipating that the customer will need the plurality of preferred responses to be provided in view of the unexpected event, including by determining a type of information requested by the customer upon a previous occurrence of the unexpected event;
storing the data related to the occurrence of the unexpected event in the cache, wherein the data related to the occurrence of the unexpected event comprises the plurality of preferred responses to the unexpected event, the plurality of preferred responses including at least the name and contact information of an adjuster, a claim number, and a list of collision repair shops; and
sending a notification to the computing device associated with the customer, the notification indicating that the plurality of preferred responses to the unexpected event have been stored in the cache; and
allowing the customer to take an action using the computing device in response to accessing the cache and receiving the plurality of preferred responses.

15. The method of claim 14,
wherein the step of identifying, using the definition and information received from the remote device, the occurrence of the unexpected event further includes the user submitting information describing damage to a vehicle and injuries suffered by persons involved in the car accident.

16. The method of claim 14, wherein identifying the occurrence of the unexpected event comprises receiving data about a publicly disseminated event.

17. The method of claim 14, further comprising identifying that the customer is likely to be affected by the unexpected event.

18. The method of claim 14, wherein the step of allowing the customer to take an action in response to accessing the cache and receiving the plurality of preferred responses includes allowing the customer to submit an insurance claim.

19. The method of claim 14, further comprising:
receiving new information about the unexpected event prior to receiving an action from the customer on at least one of the plurality of preferred responses; and
updating the data related to the occurrence of the unexpected event stored in the cache based on the new information, wherein updating the data changes at least one of the plurality of preferred responses to the unexpected event.

20. The method of claim 14, further comprising encrypting the data stored in the cache, wherein the cache is on the computing device associated with the customer or on a cloud server.

\* \* \* \* \*